US008677321B2

(12) United States Patent
Olsa et al.

(10) Patent No.: US 8,677,321 B2
(45) Date of Patent: Mar. 18, 2014

(54) USER-SPACE PROBE BASED DEBUGGING

(75) Inventors: Jiri Olsa, Brno (CZ); Anton Arapov, Vranov (CZ)

(73) Assignee: Red Hat, Inc., Raleigh, NC (US)

( * ) Notice: Subject to any disclaimer, the term of this patent is extended or adjusted under 35 U.S.C. 154(b) by 323 days.

(21) Appl. No.: 13/158,833

(22) Filed: Jun. 13, 2011

(65) Prior Publication Data

US 2012/0317548 A1 Dec. 13, 2012

(51) Int. Cl.
*G06F 9/44* (2006.01)

(52) U.S. Cl.
USPC .............................. 717/124; 717/127; 717/129

(58) Field of Classification Search
None
See application file for complete search history.

(56) References Cited

U.S. PATENT DOCUMENTS

| 795,002 | A  | * | 7/1905 | Nelson ........................ 114/61.13 |
|---|---|---|---|---|
| 6,988,264 | B2 | * | 1/2006 | Sarma et al. .................. 717/127 |
| 7,047,520 | B2 | * | 5/2006 | Moore et al. ................... 717/129 |
| 7,523,446 | B2 | * | 4/2009 | Keniston ........................ 717/129 |
| 7,770,073 | B2 | * | 8/2010 | Fashchik et al. ................ 714/48 |
| 7,950,001 | B2 | * | 5/2011 | Panchamukhi et al. ........ 717/127 |
| 7,950,002 | B2 | * | 5/2011 | Moore ........................... 717/124 |
| 8,056,068 | B2 | * | 11/2011 | Akulavenkatavara et al. ............................. 717/159 |
| 8,402,318 | B2 | * | 3/2013 | Nieh et al. ..................... 717/124 |
| 8,429,613 | B2 | * | 4/2013 | Rosen ........................... 717/124 |
| 8,468,501 | B2 | * | 6/2013 | Subhraveti .................... 717/124 |
| 8,527,963 | B2 | * | 9/2013 | Cox et al. ...................... 717/124 |
| 2003/0177476 | A1 | * | 9/2003 | Sarma et al. .................. 717/128 |
| 2004/0098639 | A1 | * | 5/2004 | Liu ................................ 717/129 |
| 2006/0265693 | A1 | * | 11/2006 | Goldin .......................... 717/124 |
| 2007/0055958 | A1 | * | 3/2007 | Birenheide et al. ........... 717/124 |
| 2008/0098362 | A1 | * | 4/2008 | Moore ........................... 717/129 |
| 2008/0133896 | A1 | * | 6/2008 | Keniston ........................ 712/227 |
| 2008/0295077 | A1 | * | 11/2008 | Sengupta et al. ............. 717/124 |
| 2009/0031171 | A1 | * | 1/2009 | Fashchik et al. ............... 714/38 |
| 2009/0070558 | A1 | * | 3/2009 | Akulavenkatavara et al. ............................. 712/214 |
| 2011/0296387 | A1 | * | 12/2011 | Cox et al. ...................... 717/127 |

OTHER PUBLICATIONS

William Gatliff, "Implementing a Remote Debugging Agent Using the GNU Debugger", 2001, Embedded Systems Programming Magazine, pp. 1-22; <http://www.cems.uwe.ac.uk/~rwilliam/FSSE_ufeETV-20-1/gnu_gdb.pdf>.*

Quynh et al., "Xenprobes, A lightweight User-space Probing Framework for Xen Virtual Machine", 2007 USENIX Annual Technical Conference, USENIX Association, pp. 15-28; <www.usenix.org/event/usenix07/tech/full_papers/quynh/quynh.pdf>.*

(Continued)

*Primary Examiner* — Thuy Dao
*Assistant Examiner* — Ben C Wang
(74) *Attorney, Agent, or Firm* — Lowenstein Sandler LLP (57) ABSTRACT

Methods and systems for user-space probe debugging are described. In one embodiment, a computing system receives a request from a user interface to debug a target application. In response to the request, the computing system runs the target application in a debug mode with an attached debugger. The debugger and the target application appear as a single application in a user-space of the computing system. The debugger has access to application memory of the target application. The computing system receives a command to perform a debug operation on the target application, such as setting a breakpoint, reading the application memory, or the like. The debugger performs the debug operation on the target application without communicating with a kernel of the computing system, and outputs debug information after performing the debug operation.

24 Claims, 7 Drawing Sheets

(56) References Cited

OTHER PUBLICATIONS

Jeong et al., "User Space Dynamic Instrumentation based on kprobe", Apr. 6, 2009, Samsung Advanced Institute of Technology & Samsung Research Center in Moscow, pp. 1-27; <http://elinux.org/images/e/el/ELC2009_User_space_dynamic_instrumentation_based_on_kprobe-0331-final.pdf>.*

Yang et al., "PLC Remote Debugger Development Using GDB", 2009 IEEE, ISOCC 2009, pp. 540-543; <http://ieeexplore.ieee.org/stamp/stamp.jsp?tp=&arnumber=5423826>.*

Ho et al., "On the Design of a Pervasive Debugger", 2005 ACM, AADEBUG'05, Sep. 19-21, 2005, Monterey, California, USA, pp. 117-121; <http://dl.acm.org/citation.cfm?doid=1085130.1085146>.*

* cited by examiner

USER-SPACE PROBE BASED DEBUGGING

TECHNICAL FIELD

Embodiments of the present invention relate to debugging, and more specifically, to user-space probe based debugging.

BACKGROUND

Debugging is a methodical process of finding and reducing the number of bugs, or defects, in a computer program, thus making it behave as expected. Debugging ranges in complexity from fixing simple errors to performing lengthy and tiresome tasks of data collection, analysis, and scheduling updates. The debugging skill of the programmer can be a major factor in the ability to debug a problem, but the difficulty of software debugging varies greatly with the complexity of the system, and also depends, to some extent, on the programming language(s) used and the available tools, such as debuggers. Debuggers are software tools which enable the programmer to monitor the execution of a program, stop it, restart it, set breakpoints, and change values in memory. More specifically, the debugger is a computer program that is used to test and debug other programs, sometimes called target programs. The term debugger can also refer to the person who is doing the debugging.

Conventional debuggers interact with the kernel in order to stop the application, restart the application, set breakpoints, and to access application memory. Some kernels include a kernel debugger, which resides in the kernel and operates in kernel-space, like a stub implementing low-level operations that interacts with a debugger, such as GNU Debugger (GDB) or DBX. The debugger may run on a separate machine than the kernel debugger, sending commands to the stub over a serial line or a network connection. For example, conventional debuggers, such as GDB and DBX, use kernel ptrace support to interact with the kernel to debug an application. Ptrace, which is short for process trace, is a system call found in various operating systems. By using ptrace, one process can control another, enabling the controller (i.e., the debugger) to inspect and manipulate the internal state of its target. Debuggers, such as GDB and DBX, use ptrace to obtain extensive control over the operation of its target, including manipulating its file descriptors, memory, and registers. Kernels include a ptrace kernel application programming interface (API) to allow the debugger to interact with the kernel.

Since conventional debuggers need to interact with the kernel to debug an application, these kernel-based debuggers have some limitations. For example, some embedded systems have the ptrace kernel API disabled due to very tight constraints imposed on the kernel, thus disallowing a debugger to interact with the kernel to debug an application in this environment. Also, since the ptrace kernel API has been around a long time, in some cases it is not well suited for the needs of modern debugging technologies.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Methods and systems for user-space probe debugging are described. In one embodiment, a computing system receives a request from a user interface to debug a target application. In response to the request, the computing system runs the target application in a debug mode with an attached debugger. The debugger is software code that has a shared library and is added to the target application's address space. The target application is run in the debug mode when the software code of the debugger is attached to the target application on start and is invoked before software code of the target application starts. The debugger and the target application appear as a single application in a user-space of the computing system. So the single application starts with running the debugger code first, giving the debugger full control over the target application. The debugger has access to application memory of the target application. The computing system receives a command to perform a debug operation on the target application, such as setting a breakpoint, reading the application memory, or the like. The debugger performs the debug operation on the target application without communicating with a kernel of the computing system, and outputs debug information after performing the debug operation. In one embodiment, the command is a set breakpoint command for which the debug application installs a user-space probe at a breakpoint in the target application. The user-space probe is configured to redirect an execution path of the target application from the breakpoint to the debugger when the breakpoint in the target application is reached. The debugger may generate a notification in response to the breakpoint being reached and may output an application state of the target application to a user interface. In one embodiment, the debugger communicates with the user interface using a remote serial protocol (RSP). Alternatively, other protocols may be used. The request to debug the target application and the command to perform debug operations may be received from a user via the user interface. Alternatively, the request to debug the target application and the command to perform debug operations may be received from other sources, such as another computer process. However, since the debugger is started when starting the application in the debug mode, the request to start the target application in the debug mode would not be received by the debugger from the user via the user interface using RSP. Rather, the user may send the request to start the target application in the debug mode using another interface as would be appreciated by one of ordinary skill having the benefit of this disclosure. Alternatively, the request to start the target application may be received from other sources, such as another application.

Embodiments of the present invention provide an improved system that allows user-space probe based debugging, instead of kernel based debugging. Operating systems usually segregate virtual memory into kernel space and user space. Kernel space is strictly reserved for running the kernel, kernel extensions, and most device drivers. User space is the memory area where all user mode applications run. Unlike conventional solutions that use ptrace kernel APIs or otherwise require access to the kernel-space, the embodiments described herein run a debugger in the user-space that uses user-space probes to set breakpoints and to access the application memory. A probe is application code that includes instructions placed in memory, each instruction being read and executed by the processing device. A breakpoint is a point in the application instructions where the debugger can stop at that point in order to examine the state of the application, such as the state of variables, state of registers, or the like. Setting a breakpoint using the user-space probe means that the instructions of the target application are replaced with the instructions of the user-space probe to redirect code flow (execution path) to the software code of the debugger. Once the user-space probe is executed, the debugger saves the machine state and runs its own software code, for example, to report the breakpoint to the user, receiving a new command to set another breakpoint, etc. Once the debugger is finished, the saved machine state is restored, and the replaced instruction of the target application is executed, and the code flow (execution path) is handed back to the target application where the code flow was diverted. The embodiments described herein may be used for debugging applications in embedded systems, where the ptrace kernel API is disabled. In other embodiments, the user-space probe debugging can be used in connection with, or in addition to, kernel-based debuggers. The embodiments described herein may be easier to use than the kernel-based debuggers, which are limited by the legacy ptrace kernel API. The embodiments described herein may be used in the Linux environment, as well as other environments, such as Unix-based environments, Windows environments, or the like, as would be appreciated by one of ordinary skill in the art having the benefit of this disclosure. For example, the cygwin environment emulates the Linux environment, and thus, the embodiments could be used to run the user-space probe debugger in the Windows environment.

In the following description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the embodiments of the present invention.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "generating," "communicating," "capturing," "executing," "defining," "specifying," "creating," "recreating," "processing," "providing," "computing," "calculating," "determining," "displaying," "detecting," "sending," "receiving," or the like, refer to the actions and processes of a computing system, or similar electronic computing systems, that manipulates and transforms data represented as physical (e.g., electronic) quantities within the computing system's registers and memories into other data similarly represented as physical quantities within the computing system memories or registers or other such information storage, trans-mission or display devices.

Embodiments of the present invention also relate to an apparatus for performing the operations herein. This apparatus may be specially constructed for the required purposes, or it may comprise a general-purpose computing system specifically programmed by a computer program stored in the computing system. Such a computer program may be stored in a computer-readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

Figure 1:
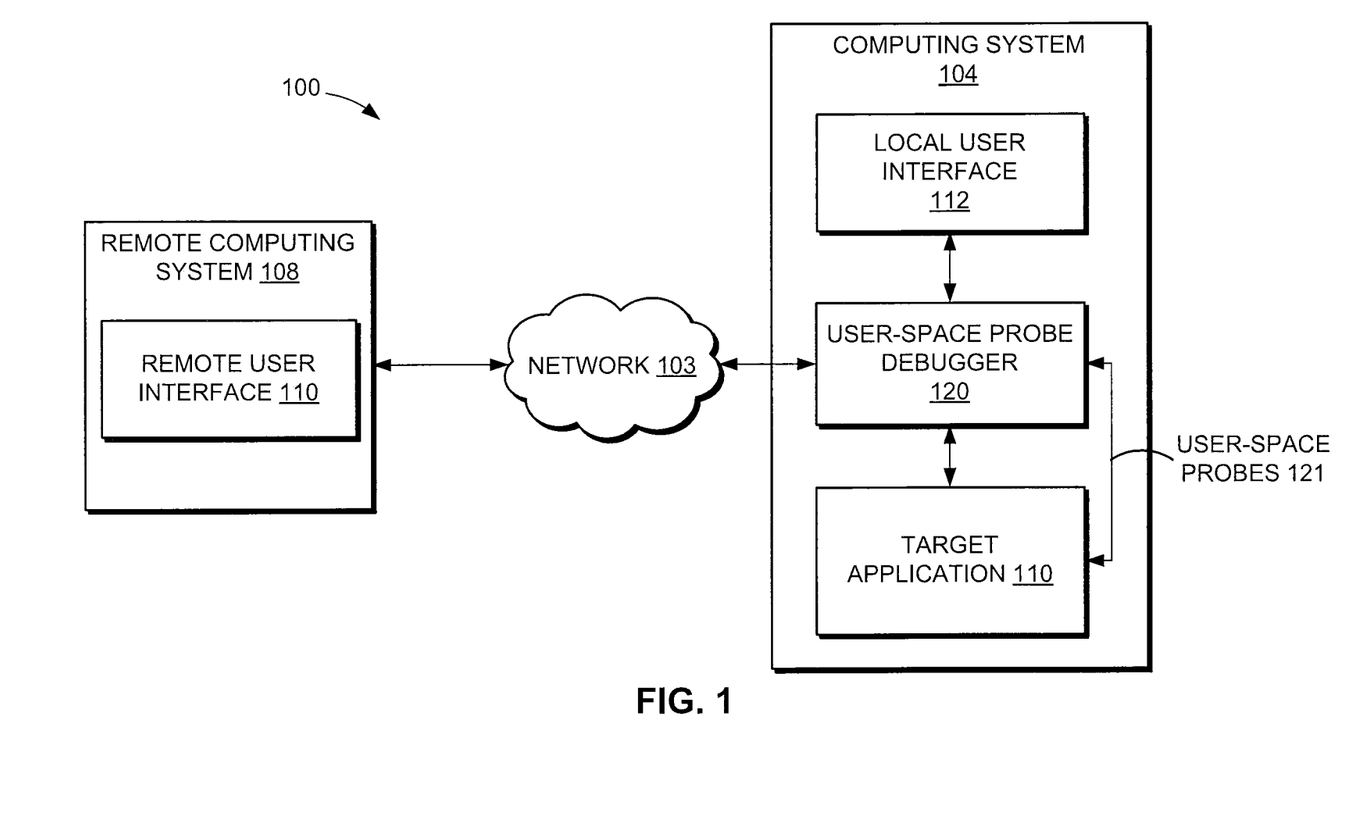
FIG. 1 is a block diagram of an exemplary network architecture in which embodiments of a user-space probe debugger may operate.

FIG. 1 is a block diagram of exemplary network architecture 100 in which embodiments of a user-space probe debugger 120 may operate. The network architecture 100 may include a computing system 104 and a remote computing system 108, each connected via a network 103, which may be a private network (e.g., a local area network (LAN), wide area network (WAN), intranet, etc.) or a public network (e.g., the Internet). The computing system 104 may be one or more machines including one or more server computers, gateways, or other computing systems, including client machines, such as a desktop computer, laptop computer, server, cellular phone, personal digital assistant (PDA), etc., and server machines, including gateways, server workstations, etc. The computing system 104 hosts the user-space probe debugger 120 and a target application 110. The user-space probe debugger 120 uses user-space probes 121 to interact with the target application 110 to debug the target application 110 without interacting with the kernel for debugging purposes. The user-space probe debugger 120 may be a process run on the computing system 104 to debug the target application 110. For example, the user-space probe debugger 120 may receive a request from a user via a local user interface 112, or from a remote user interface 110 on the remote computing system 108 via the network 103.

In the illustrated embodiment, the user-space probe debugger 120 is depicted as software executed on the computing system 104. In another embodiment, the user-space probe debugger 120 may be a dedicated machine, or may one of various processes being performed by the computing system 104. The operations of the user-space probe debugger 120 are described in more detail below with respect to FIGS. 2-4C. The computing system 104 may include a local user interface 112, such as a command line interface (CLI) or a graphical user interface (GUI), for allowing a user, such as a system administrator, to request the debugging of the target application 110, as well as to request other debug operations as described herein.

The computing system 104 may include one or more data stores (not shown). The data stores can be one or more centralized data repositories that store application data, system data, configuration data, or the like. The data stores may be local or remote data stores and may be single or multiple data structures (databases, repositories, files, etc.) residing on one or more mass storage devices, such as magnetic or optical storage based disks, tapes or hard drives.

The remote computing system 108 may be one or more machines, including a desktop computer, laptop computer, server, cellular phone, personal digital assistant (PDA), etc. The remote computing system 108 may also be a server machine as would be appreciated by one of ordinary skill in the art having the benefit of this disclosure. The remote computing system 108 interacts with the computing system 104 by exchanging messages via standard protocols, e.g., FTP and HTTP. In one embodiment, the remote computing system 108 communicates with the computing system 104 using RSP, as described herein. The remote computing system 108 include a remote user interface 110, such as a command line interface (CLI) or a graphical user interface (GUI), for allowing a user, such as a system administrator, to request the debugging of the target application, as well as requests other debug operations as described herein.

Figure 2:
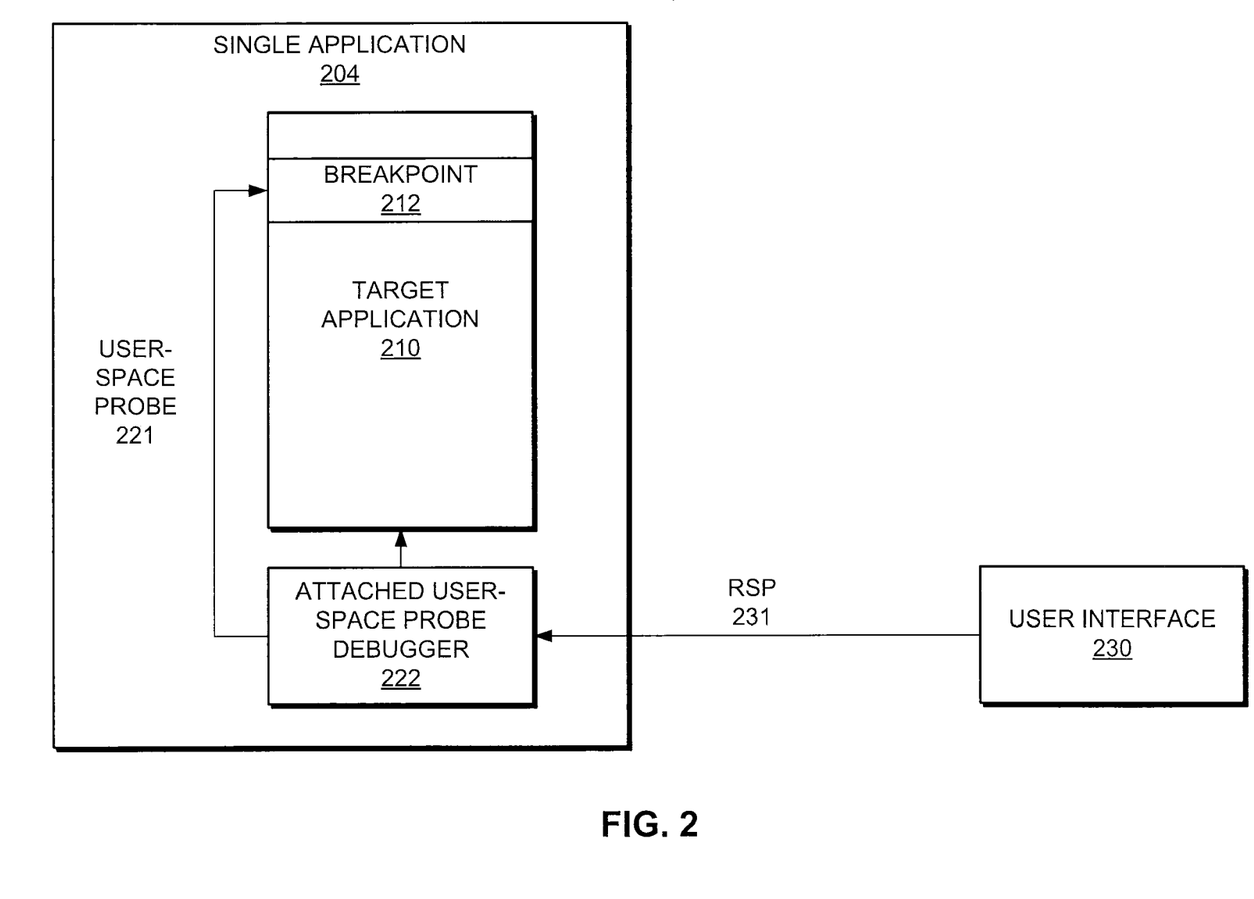
FIG. 2 is a block diagram of a single application including a target application and an attached user-space probe debugger according to one embodiment.

FIG. 2 is a block diagram of a single application 204 including a target application 210 and an attached user-space probe debugger 222 according to one embodiment. In the depicted embodiment, when the user wants to debug the target application 210, the user runs the application 210 in a debug mode with the attached user-space probe debugger 222. The target application 210 is run in the debug mode when the user-space probe debugger 222 is attached to the target application 210 on start and is invoked before the target application 210 starts. In one embodiment, a system dynamic loader feature can be used to ensure the user-space probe debugger 222 is loaded inside the application memory and is executed before the target application itself. The target application 210 and the user-space probe debugger 222 appear as the single application 204 in a user-space of the computing system. So the single application 204 starts with running the user-space probe debugger 222 first, giving the user-space probe debugger 222 full control over the target application 210. The user-space probe debugger 222 has access to application memory of the target application 210. The attached user-space probe debugger 222 is transparent to the computing system in that the kernel is not involved in debugger and the user-space debugger 222 and target application 210 appear to other applications and the kernel as the single application that is not being debugged. The attached user-space probe debugger 222 allows a user to access the application memory when debugging the target application 210. After the target application 210 is running, the user can debug the target application 210 by using various debug operations, including setting breakpoints in the target application 210, reading application memory of the target application 210, or the like. The user interface (e.g., 110 or 112) allows the user to interact with the user-space probe debugger 222 to debug the target application 210 without interacting with the kernel for debugging purposes.

In the depicted embodiment, the user interface 230, which may be the remote user interface 110 of FIG. 1, is arranged via an RSP stub implementation. Thus, any interface that supports RSP may be used for interfacing with the user-space probe debugger 222. RSP is a protocol designed for remote debugging. For example, the user can run the debugger on a server B remotely from a remote location at server A, and communicate remotely with the debugger running on server B from server A. The communication between server A and server B is governed by RSP. If the user wants to setup a breakpoint on address 1234, server A side of the debugger creates an RSP message with "SET BREAKPOINT AT ADDRESS 1234," and sends the message to the server B. The server B side of the debugger recognizes this RSP message and sets the breakpoint. RSP protocol specifies that server B should send the status of the operation. Thus, server B creates an RSP status message with "BREAK SET CORRECTLY." Server A recognizes this message and informs the user that the breakpoint is set. In the depicted embodiment, the user-space probe debugger 222 is executed before the target application 210, and the user-space probe debugger 222 takes over the target application 210 when executed. The user-space probe debugger 222 suspends execution of the target application 210 until it is contacted by a user via the user interface 230 via the RSP protocol. The user then sets the breakpoint, by requesting, via RSP, that the user-space probe debugger 222 install a user-space probe 221 (described below) at a breakpoint 212 in the target application 210. The execution of the target application 210 is resumed, and when the breakpoint 212 is reached, the user-space probe debugger 222 suspends the target application 210, taking over execution of the target application 210 by redirecting the execution path to the user-space probe debugger 222 using the user-space probe 221. The user-space probe debugger 222 may contact the user via the user interface 230 via RSP about the breakpoint 212 being reached. The user may then analyze the application state at the breakpoint 212. This process can be repeated as needed by the user to debug the target application 210.

In the depicted embodiment, the user-space probe 221 redirects an execution path from the breakpoint 212 in the target application 210 to the user-space probe debugger 222. In one embodiment, the user-space probe 221 uses a user-space port of a kernel-space probe (kprobe). For example, the kprobes port used by gelf is called 'usprobe' and it implements the optimized kprobes (djprobes) for user-space usage. It should be noted that usprobe should not be confused with the IBM uprobes project. In short, kprobes allows the kernel to put a probe on nearly every memory space and have user defined callbacks called when the memory location of the kprobe is reached. The kprobes work by putting breakpoint instruction on the probe address, and handling the exception accordingly. Just recently the kprobes were enhanced with optimized probes, which allow probing the kernel without using the breakpoint instruction and exception handling. The optimized probes work simply by overwriting the probe memory by relative jump to the software code in the debugger. The software codes saves the application state, including the saved instructions, and after performing the debug operation, resumesresumes the normal execution of the target application with the saved state. The user-space probe 221 calls the user-space probe debugger 222 when the memory location of the breakpoint 212 is reached. Using the user-space probes, the user-space probe debugger 222 can suspend and resume execution of the target application 210 without communicating with the kernel to suspend and resume execution.

It should be noted that the embodiments of user-space probe based debugging allows a debugger to run without kernel-space support (e.g., kernal ptrace support) to interact with the kernel. In the embodiments described herein, the user-space probe debugger 222 does not communicate, or otherwise interact, with the kernel of the computing system for purposes of debugging. Since the target application 210 and the user-space probe debugger 222 appear as the single application 204, the kernel does not know the target application 210 is being debugged by the user-space probe debugger 222. It should also be noted that once the execution is within the user-space probe debugger 222, the user-space probe debugger 222 communicates with the user interface 230 via RSP described below. Alternatively, the user-space probe debugger 222 can communicate with the user interface using other protocols as would be appreciated by one of ordinary skill in the art having the benefit of this disclosure.

As described above, in one embodiment, the user-space probe debugger 222 communicates with the user interface 230 via RSP. RSP comes from the GNU Debugger project, called GDB. GDB is the standard debugger for the GNU software system. It is a portable debugger that runs on various operating systems and provides facilities for tracing and altering the execution of computer programs. The user can monitor and modify the values of programs' internal variables, and even call functions independently of the programs' normal behavior. GDB also offer a remote mode, often used when debugging embedded systems, in which the GDB operations are run on one machine (e.g., remote computing system 108), and the application being debugged is run on another machine (e.g., computing system 104). In this case, the GDB communicates with a remote "stub" which understands the GDB protocol via serial, TCP/IP, or other transport protocols. The stub may implement the target-side of the communication protocol. In one embodiment, the user-space probe debugger 222 is the remote stub that communicates with a remote debugger (e.g., GDB) running on a remote machine. In this manner, the GDB can control the debugging user interface remotely using the user-space probe debugger 222. In another embodiment, the user-space probe debugger 222 is the debugger itself (e.g., includes the code for debugging the target application), and provides the user interface to the user on the remote machine or on a local machine as described herein. It should be noted that the user-side of the debugger could be on any type of machine, such as, for example, a machine running the Windows operating system, so long as the machine can communicate using the user interface described herein (e.g., can communicate via RSP).

Figure 3:
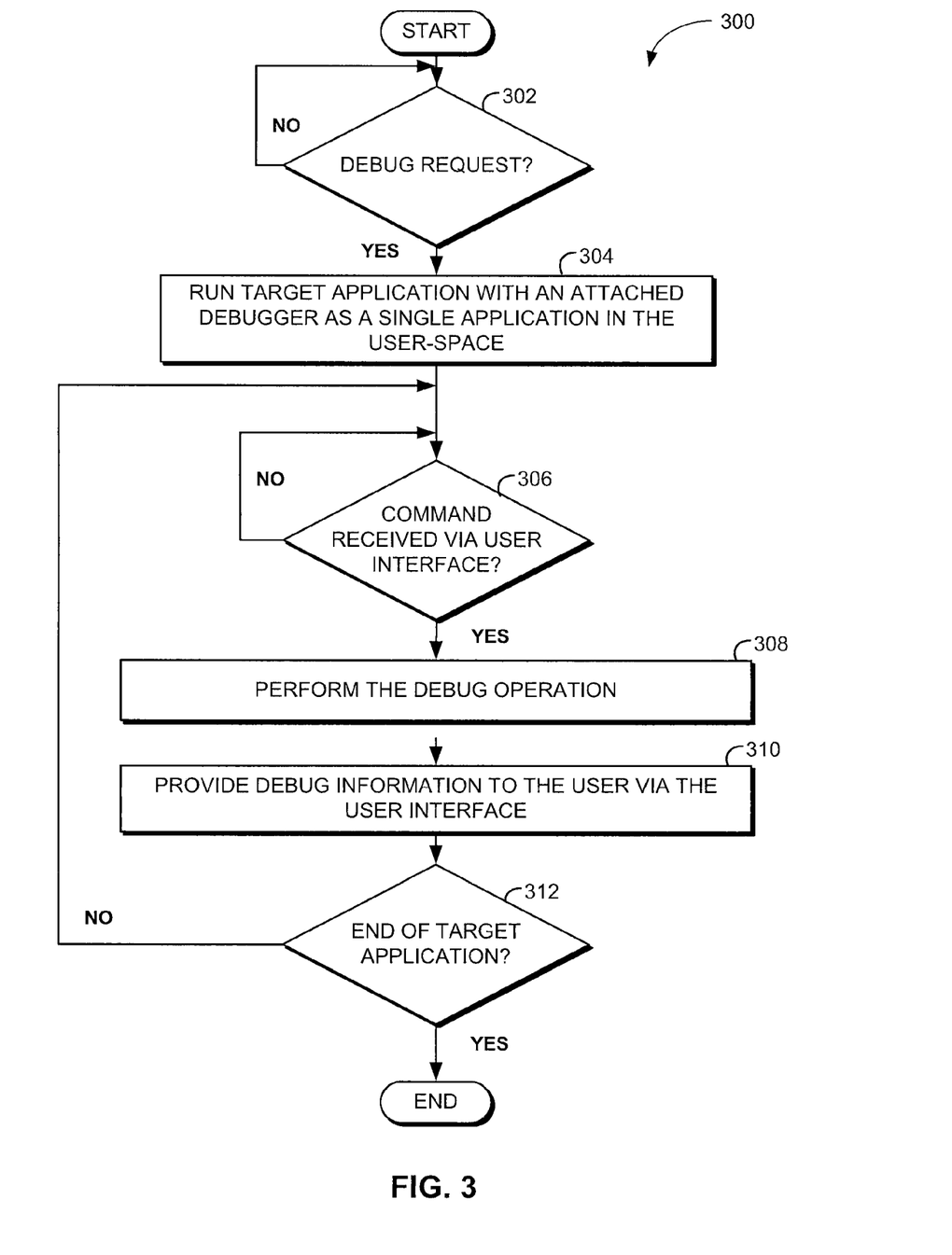
FIG. 3 is a flow diagram of one embodiment for a method of user-space probe debugging.

FIG. 3 is a flow diagram of one embodiment for a method 300 of user-space probe debugging. The method 300 is performed by processing logic that may comprise hardware (circuitry, dedicated logic, etc.), software (such as is run on a general purpose computing system or a dedicated machine), firmware (embedded software), or any combination thereof. In one embodiment, the user-space probe debugger 120 of FIG. 1 performs the method 300. In another embodiment, the user-space probe debugger 222 of FIG. 2 performs the method 300. Alternatively, other components of the computing system 104, the remote computing system 108, or both can perform some or all of the operations of method 300.

Referring to FIG. 3, processing logic begins with determining if a debug request to debug a target application is received from a user via a user interface (block 302). When the processing logic receives the debug request, the processing logic runs the target application in a debug mode with an attached debugger (block 304). The debugger and the target application appear as a single application in a user-space of the computing system upon which the applications are being run. The debugger has access to application memory of the target application. Next, at block 306, the processing logic waits to receive a command from the user via the user interface to perform a debug operation on the target application. When the processing logic receives the command at block 306, the processing logic performs the debug operation on the target application (block 308). The processing logic performs the debug operation without communicating with a kernel of the computing system. After performing the debug operation at block 308, the processing logic outputs debug information to the user via the user interface (block 310). The debugging information may include some or all of the contents of the application memory, the application state, or other information that may be used for debugging. Next, processing logic determines if the end of the target application is reached (block 312). If not, the processing logic returns to decision block 306 to see if an additional command is received from the user via the user interface. Otherwise, the processing logic ends the method 300.

In one embodiment, the debug operation is a set breakpoint command, as described below with respect to FIG. 4A. In another embodiment, the debug operation is a read memory command, for which the processing logic reads contents of the application memory and sends the contents of the application memory to the user interface, as described below with respect to FIG. 4B.

Figure 4A:
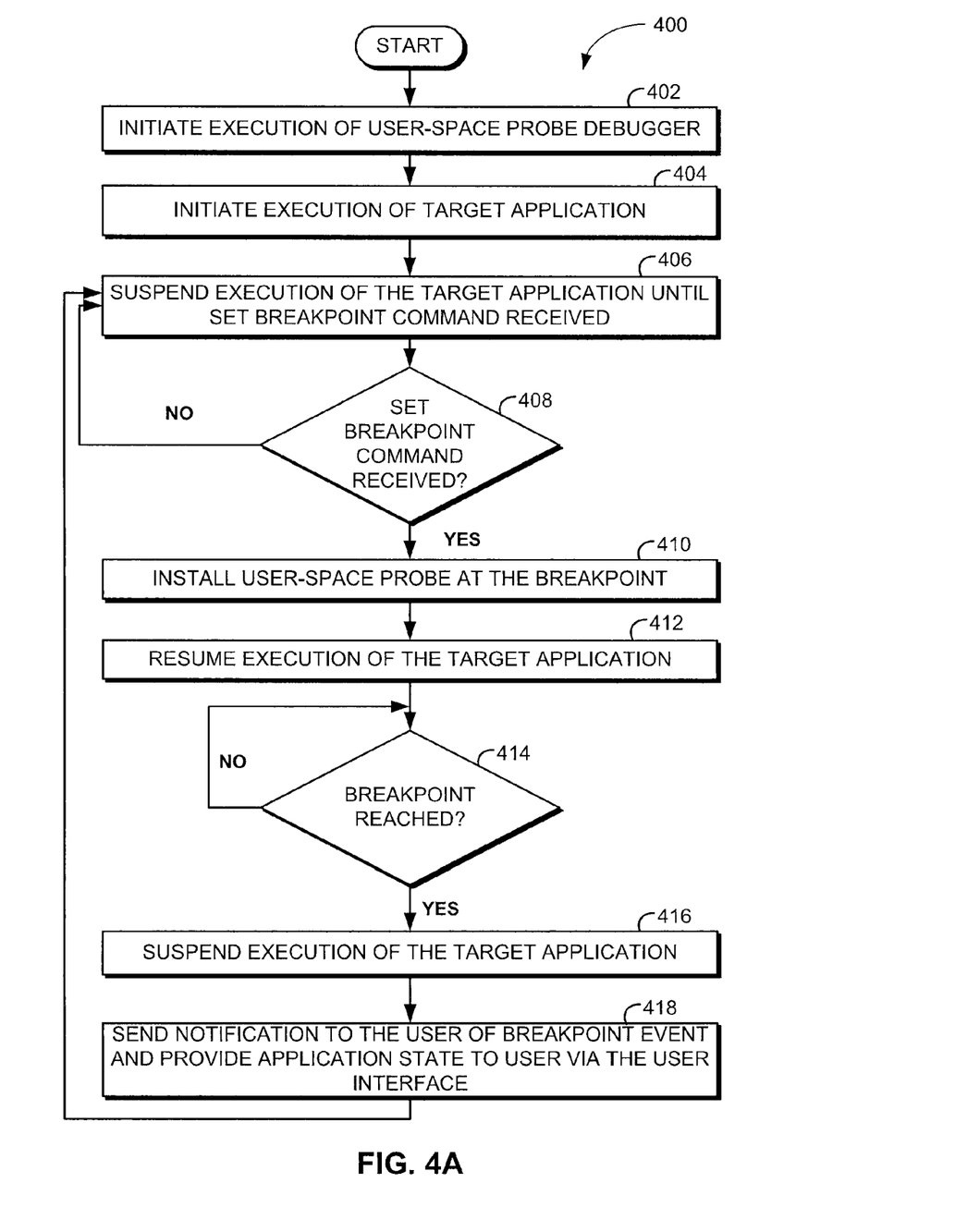
FIG. 4A is a flow diagram of one embodiment for a method of performing a set breakpoint command.

FIG. 4A is a flow diagram of one embodiment for a method 400 of performing a set breakpoint command. The method 400 is performed by processing logic that may comprise hardware (circuitry, dedicated logic, etc.), software (such as is run on a general purpose computing system or a dedicated machine), firmware (embedded software), or any combination thereof. In one embodiment, the user-space probe debugger 120 of FIG. 1 performs the method 400. In another embodiment, the user-space probe debugger 222 of FIG. 2 performs the method 400. Alternatively, other components of the computing system 104, the remote computing system 108, or both can perform some or all of the operations of method 400.

Referring to FIG. 4A, processing logic begins with initiating execution of the user-space debugger (block 402). This may be done in response to receiving a request to debug a target application by the user via the user interface, as described herein. Next, the processing logic initiates execution of the target application by the user-space probe debugger (block 404). The processing logic suspends execution of the target application until a set breakpoint command is received from the user via the user interface (block 406). At block 408, the processing logic determines if the set breakpoint command is received. If not, the processing logic waits until the set breakpoint command is received. If at block 408 the set breakpoint command is received, the processing logic installs a user-space probe at a breakpoint in the target application (block 410), and resumes execution of the target application (block 412). In one embodiment, the user-space probe is configured to redirect an execution path of the target application from the breakpoint to the debugger when the breakpoint in the target application is reached. When the breakpoint is reached at block 408, the processing logic suspends execution of the target application (block 416), and sends a notification to the user of the breakpoint event and may output an application state to the user via the user interface (block 418). In one embodiment, the processing logic returns to block 406 to suspend execution of the target application until another set breakpoint command is received from the user. Alternatively, the processing logic can perform other debug operations when the breakpoint is reached at block 414 as would be appreciated by one of ordinary skill in the art having the benefit of this disclosure.

In a further embodiment, the processing logic initiates execution of the debugger, and the debugger takes over control of execution of the target application. After, the processing logic, using the debugger, then initiates execution of the target application. The processing logic suspends the execution of the target application until receiving the command to set the breakpoint from the user via the user interface. At this point, the processing logic installs the user-space probe at the breakpoint, and resumes execution of the target application after installing the user-space probe at the breakpoint in the target application. When the breakpoint is reached, the processing logic suspends execution of the target application again and performs any debug operations by the user-space probe debugger, including sending a notification to the user via the user interface that the breakpoint in the target application is reached. In these embodiments, the user-space probe debugger does not interact with a kernel for purposes of debugging the target application. Rather, the user-space probe debugger interacts with the user-space probe installed at the breakpoint to jump in and out of the target application.

In one embodiment, as depicted in blocks 402 and 404, the user-space probe debugger is started before the target application. This may allow the user-space probe debugger to have control over the target application. In another embodiment, the user-space probe debugger is attached to the target application so that the user-space probe debugger appears as the same application with the target application. By initiating execution of the user-space probe debugger and the target application in this order, or by attaching the user-space probe debugger to the target application, the user-space probe debugger has access to the application memory of the target application. Alternatively, other mechanisms may be used to allow the user-space probe debugger to control the target application and have access to the application memory as would be appreciated by one of ordinary skill in the art having the benefit of this disclosure.

As described herein, the processing logic can communicate with the user interface using RSP. Alternatively, other protocols may be used. The user interface may be a graphical user interface or may be a text-based user interface, such as a command line interface.

Figure 4B:
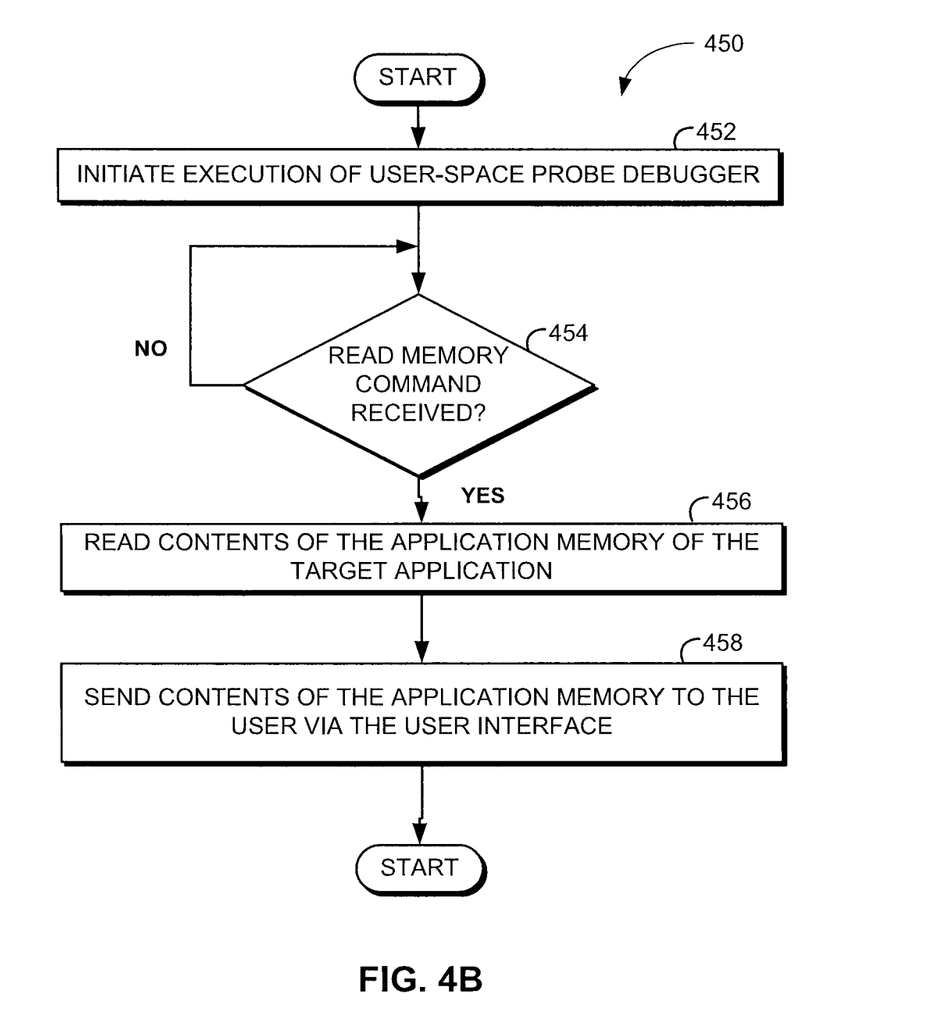
FIG. 4B is a flow diagram of one embodiment for a method of performing a read memory command.

FIG. 4B is a flow diagram of one embodiment for a method 450 of performing a read memory command. The method 450 is performed by processing logic that may comprise hardware (circuitry, dedicated logic, etc.), software (such as is run on a general purpose computing system or a dedicated machine), firmware (embedded software), or any combination thereof. In one embodiment, the user-space probe debugger 120 of FIG. 1 performs the method 450. In another embodiment, the user-space probe debugger 222 of FIG. 2 performs the method 450. Alternatively, other components of the computing system 104, the remote computing system 108, or both can perform some or all of the operations of method 400.

Referring to FIG. 4B, processing logic begins with initiating execution of a user-space probe debugger (block 452). At block 454, the processing logic determines that a read memory command is received. When the read memory command is received, the processing logic reads contents of the application memory of the target application (block 456), and sends the contents of the application memory to the user via the user interface (block 458), and the method 450 ends. In another embodiment, the processing logic determines if other commands for other debug operations have been received. In one embodiment, the processing logic communicates with the user interface using RSP as described herein. Alternatively, other protocols may be used.

Figure 4C:
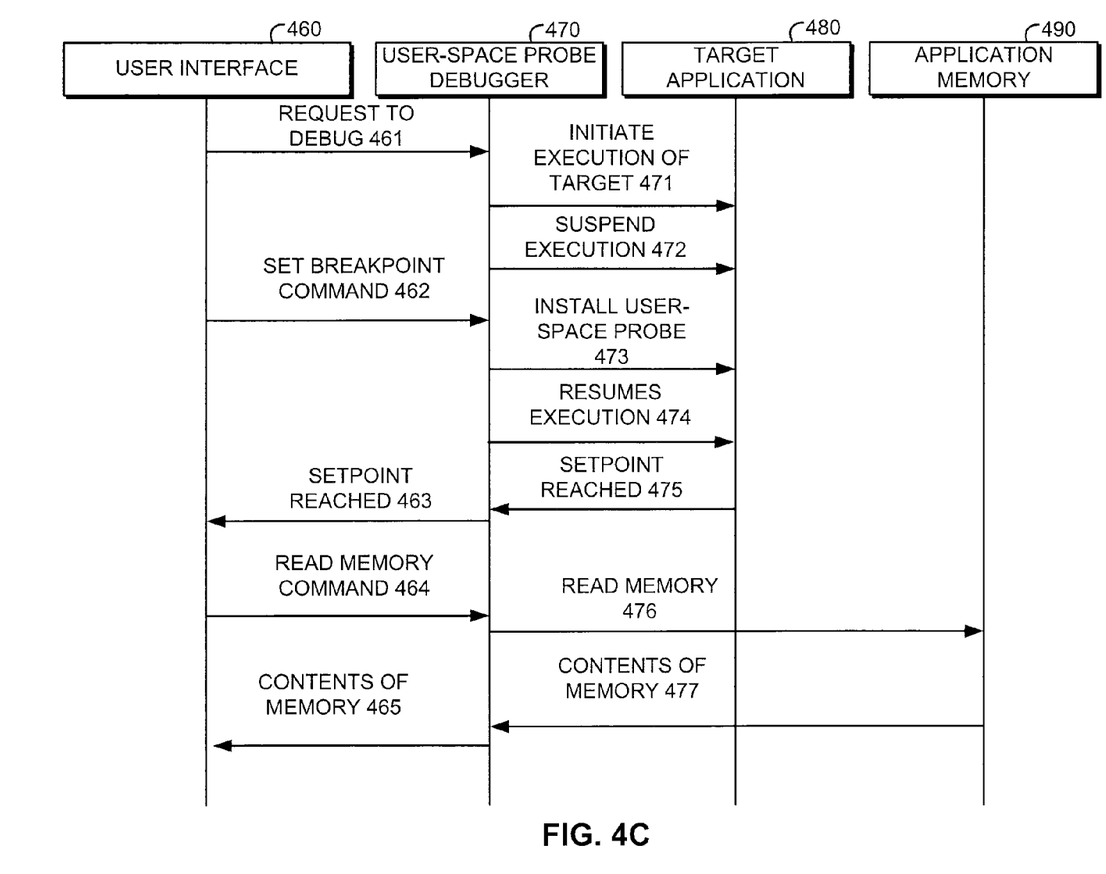
FIG. 4C is a flow diagram of one embodiment of a user-space probe debugger.

FIG. 4C is a flow diagram of one embodiment of a user-space probe debugger. The user-space probe debugger 470 resides on a computing system upon which the target application to be debugged is run. The user interface 460 may reside on the same computing system or on a remote computing system. The user-space probe debugger 470 may communicate with the user interface 460 using RSP. For example, the user-space probe debugger 470 receives a request to debug 461 a target application 480 from the user interface 460 via RSP, and the user-space probe debugger 470 initiates execution 471 of the target application 480, and suspends the execution 472 of that target application 480. The user-space probe debugger 470 then waits to receive a set breakpoint command 462 from the user interface 460 via RSP. The user-space probe debugger 470 then installs the user-space probe 473 at a breakpoint (also referred to a breakpoint location) in the target application 480, and resumes execution 474 of the target application 480. When the breakpoint is reached, the installed user-space probe suspends execution of the target application 480 (e.g., by redirecting the execution path of the target application to the user-space probe debugger), and notifies the user-space probe debugger 470 that the breakpoint is reached 475. The user-space probe debugger 470 sends a notification to the user interface 460 via RSP that the breakpoint is reached 463. In response, the user may request that the application memory be read, and the user-space probe debugger 470 receives a read memory command 464 from the user interface 460. The user-space probe debugger reads 476 the application memory 490, and receives the contents 477 of the application memory 490. The user-space probe debugger 470 sends the contents of the memory 465 to the user interface 460 via RSP. It should be noted that although the request to read memory command is a separate request from the set breakpoint command or the request to debug, in other embodiments, the request to set the breakpoint and read the memory command may be a single request, and the contents of the memory are returned when the breakpoint is reached, for example. It should also be noted that the user interface 460 and the user-space probe debugger 470 may communicate using other configurations as would be appreciated by one of ordinary skill in the art having the benefit of this disclosure.

Figure 5:
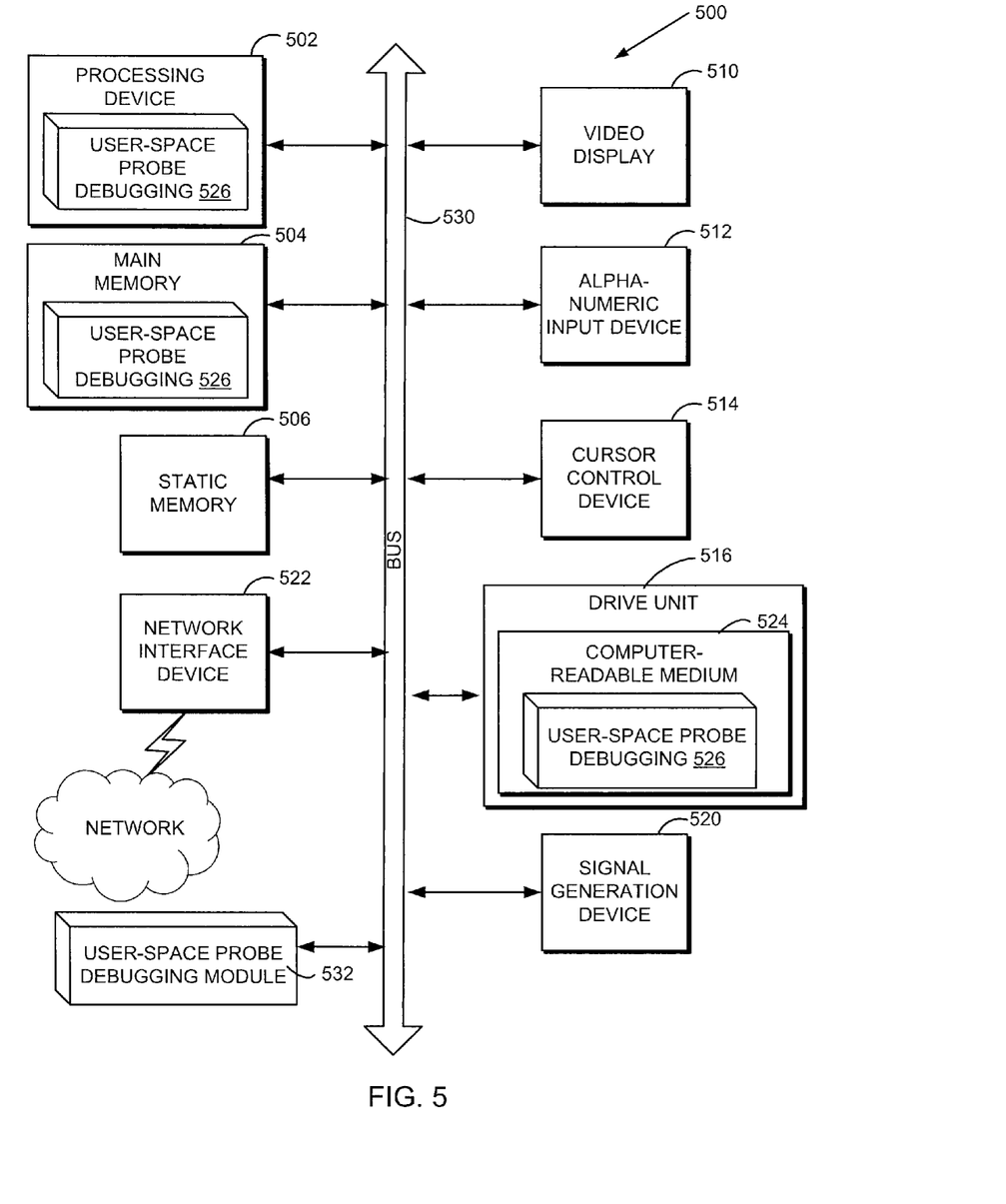
FIG. 5 illustrates a diagrammatic representation of a machine in the exemplary form of a computing system for user-space probe debugging.

FIG. 5 illustrates a diagrammatic representation of a machine in the exemplary form of a computing system 500 for user-space probe debugging. Within the computing system 500 is a set of instructions for causing the machine to perform any one or more of the methodologies discussed herein. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a PC, a tablet PC, a set-top-box (STB), a personal data assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein for user-space probe debugging, such as the methods 400 and 450 described above. In one embodiment, the computing system 500 represents various components that may be implemented in the computing system 104, the remote computing system 108, or both, as described above. Alternatively, the computing system 104 or the remote computing system 108 may include more or less components as illustrated in the computing system 500.

The exemplary computing system 500 includes a processing device 502, a main memory 504 (e.g., read-only memory (ROM), flash memory, dynamic random access memory (DRAM) such as synchronous DRAM (SDRAM), etc.), a static memory 506 (e.g., flash memory, static random access memory (SRAM), etc.), and a data storage device 516, each of which communicate with each other via a bus 530.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic (e.g., user-space probe debugging 526) for performing the operations and steps discussed herein.

The computing system 500 may further include a network interface device 522. The computing system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 516 may include a computer-readable storage medium 524 on which is stored one or more sets of instructions (e.g., user-space probe debugging 526) embodying any one or more of the methodologies or functions described herein. The user-space probe debugging 526 may also reside, completely or at least partially, within the main memory 504 and/or within the processing device 502 during execution thereof by the computing system 500, the main memory 504 and the processing device 502 also constituting computer-readable storage media. The user-space probe debugging 526 may further be transmitted or received over a network via the network interface device 522.

While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, or other types of mediums for storing the instructions.

The user-space probe debugging module 532, components, and other features described herein (for example in relation to FIGS. 1-2) can be implemented as discrete hardware components or integrated in the functionality of hardware components such as ASICS, FPGAs, DSPs, or similar devices. The user-space probe debugging module 532 may implement operations of user-space probe debugging as described herein with respect to FIGS. 4A-4C. In addition, the user-space probe debugging module 532 can be implemented as firmware or functional circuitry within hardware devices. Further, the user-space probe debugging module 532 can be implemented in any combination hardware devices and software components.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to utilize the invention and various embodiments with various modifications as may be suited to the particular use contemplated.

What is claimed is:

1. A method comprising:
   receiving, by a processor of a computing system, a request to debug a target application;
   in response to the request, running the target application to be debugged in a debug mode with a debugger attached to the target application, wherein the debugger is invoked before the target application starts, wherein the debugger and the target application appear as a single application in a user-space of the computing system, and wherein the debugger has access to application memory of the target application;
   receiving a command to perform a debug operation on the target application;
   performing, by the debugger, the debug operation on the target application without communicating with a kernel of the computing system; and
   outputting debug information after the performing the debug operation.

2. The method of claim 1, wherein the command is a set breakpoint command, wherein said performing the debug operation comprises setting a breakpoint in the target application, wherein setting the breakpoint comprises installing a user-space probe at the breakpoint in the target application in response to receiving the set breakpoint command, wherein the user-space probe redirects an execution path of the target application from the breakpoint to the debugger when the breakpoint in the target application is reached, and wherein said outputting the debug information comprises sending a notification to a user via a user interface that the breakpoint in the target application is reached.

3. The method of claim 2, wherein said outputting the debug information comprises outputting an application state of the target application to a user via a user interface when the breakpoint in the target application is reached.

4. The method of claim 1, wherein the command is a read application memory command, wherein said performing the debug operation comprises reading, by the debugger, contents of the application memory, and wherein said outputting the debug information comprises sending the contents of the application memory to a user interface.

5. The method of claim 1, wherein said receiving the request, receiving the command, and outputting the debug information comprise communicating between the debugger and a user interface using a remote serial protocol (RSP).

6. The method of claim 1, wherein the user interface is at least one of a graphical user interface or a text-based user interface.

7. A method comprising:
   receiving, at a debugger executed by a processor, the debugger attached to a target application to be debugged, a command to set a breakpoint in the target application, wherein the debugger has access to application memory of the target application, and wherein the debugger is invoked before the target application starts;
   installing, by the debugger, a user-space probe at the breakpoint in the target application, the user-space probe to redirect an execution path of the target application from the breakpoint to the debugger when the breakpoint in the target application is reached; and generating a notification in response to the breakpoint in the target application being reached.

8. The method of claim 7, further comprising:
initiating execution of the debugger, wherein the debugger takes over control of the execution of the target application; and
initiating, by the debugger, execution of the target application after said execution of the debugger.

9. The method of claim 8, further comprising:
suspending execution of the target application by the debugger until the debugger receives the command to set the breakpoint in the target application;
resuming execution of the target application after said installing the user-space probe at the breakpoint in the target application; and
when the breakpoint is reached, suspending execution of the target application and performing said generating the notification.

10. The method of claim 7, wherein the debugger does not interact with a kernel of the computing system for purposes of debugging the target application.

11. The method of claim 7, further comprising sending the notification to a user via a user interface, wherein said receiving the command and said sending the notification comprises communicating between the debugger and the user interface using a remote serial protocol (RSP).

12. The method of claim 7, further comprising:
receiving, at the debugger, a command to read the application memory of the target application;
reading, by the debugger, contents of the application memory; and
sending the contents of the application memory to a user interface.

13. The method of claim 12, wherein said receiving the command to read the application memory and sending the contents comprises communicating between the debugger and the user interface using a remote serial protocol (RSP).

14. A non-transitory computer readable storage medium including instructions that, when executed by a processor, cause the processor to perform operations comprising:
receiving, at a debugger attached to a target application to be debugged, a command to set a breakpoint in the target application, wherein the debugger has access to application memory of the target application, and wherein the debugger is invoked before the target application starts;
installing, by the debugger executed by the processor, a user-space probe at the breakpoint in the target application, the user-space probe to redirect an execution path of the target application from the breakpoint to the debugger when the breakpoint in the target application is reached; and
generating a notification in response to the breakpoint in the target application being reached.

15. The computer readable storage medium of claim 14, wherein the operations further comprise:
initiating execution of the debugger, wherein the debugger takes over control of the execution of the target application; and
initiating, by the debugger, execution of the target application after said execution of the debugger.

16. The computer readable storage medium of claim 15, wherein the operations further comprise:

suspending execution of the target application by the debugger until the debugger receives the command from the user via the user interface to set the breakpoint in the target application;
resuming execution of the target application after said installing the user-space probe at the breakpoint in the target application; and
when the breakpoint is reached, suspending execution of the target application and performing said generating the notification.

17. The computer readable storage medium of claim 14, wherein the debugger does not interact with a kernel of the computing system for purposes of debugging the target application.

18. The computer readable storage medium of claim 14, wherein the operations further comprise sending the notification to a user via a user interface, wherein said receiving the command and said sending the notification comprises communicating between the debugger and the user interface using a remote serial protocol (RSP).

19. The computer readable storage medium of claim 14, wherein the operations further comprise:
receiving, at the debugger, a command from the user via the user interface to read the application memory of the target application;
reading, by the debugger, contents of the application memory; and
sending the contents of the application memory to a user interface.

20. The computer readable storage medium of claim 19, wherein said receiving the command to read the application memory and sending the contents comprises communicating between the debugger and the user interface using a remote serial protocol (RSP).

21. A computing system, comprising:
a memory; and
a processor, coupled to the memory, to execute a debugger attached to a target application, wherein the debugger is invoked before the target application starts, the debugger to:
receive a command to set a breakpoint in the target application, wherein the debugger has access to application memory of the target application wherein the debugger is invoked before the target application starts;
install a user-space probe at the breakpoint in the target application, the user-space probe to redirect an execution path of the target application from the breakpoint to the debugger when the breakpoint in the target application is reached; and
generate a notification in response to the breakpoint in the target application being reached.

22. The computing system of claim 21, wherein the debugger does not interact with a kernel of the computing system for purposes of debugging the target application.

23. The computing system of claim 21, further comprising a network interface coupled to a network, the processor to receive the command from a user interface over the network interface.

24. The computing system of claim 21, the debugger to communicate with a user interface using a remote serial protocol (RSP).

* * * * *